United States Patent
Saadatmanesh et al.

(10) Patent No.: US 11,976,768 B2
(45) Date of Patent: May 7, 2024

(54) COMPOSITE REINFORCEMENT OF TUBULAR STRUCTURES

(71) Applicant: CARBOSHIELD, INC., Tucson, AZ (US)

(72) Inventors: Hamid Saadatmanesh, Tucson, AZ (US); Ehsan Mahmoudabadi, Tucson, AZ (US)

(73) Assignee: CARBOSHIELD, INC., Tucson, AZ (US)

(*) Notice: Subject to any disclaimer, the term of this patent is extended or adjusted under 35 U.S.C. 154(b) by 0 days.

(21) Appl. No.: 18/297,464

(22) Filed: Apr. 7, 2023

(65) Prior Publication Data

US 2023/0323995 A1    Oct. 12, 2023

Related U.S. Application Data

(60) Provisional application No. 63/328,459, filed on Apr. 7, 2022.

(51) Int. Cl.
*F16L 55/1645* (2006.01)
*F16L 55/165* (2006.01)

(52) U.S. Cl.
CPC ..... *F16L 55/16455* (2013.01); *F16L 55/1652* (2013.01)

(58) Field of Classification Search
CPC .......... F16L 55/16455; F16L 55/1652
USPC .......... 138/97, 98; 405/150.1, 184.2
See application file for complete search history.

(56) References Cited

U.S. PATENT DOCUMENTS

| | | |
|---|---|---|
| 2,897,553 A | 8/1959 | Gorrow |
| 2,961,738 A | 11/1960 | Thomas |
| 3,620,701 A | 11/1971 | Janetos |
| 3,903,714 A | 9/1975 | Horeni et al. |
| 3,963,546 A | 6/1976 | Roberti |
| 4,019,301 A | 4/1977 | Fox |
| 4,052,866 A | 10/1977 | Saunders |
| 4,079,568 A | 3/1978 | Wortman |
| 4,244,156 A | 1/1981 | Watts, Jr. |
| 4,439,071 A | 3/1984 | Roper, Jr. |

(Continued)

FOREIGN PATENT DOCUMENTS

| | | |
|---|---|---|
| EP | 0572243 A1 | 12/1993 |
| WO | 9523898 A1 | 9/1995 |

(Continued)

OTHER PUBLICATIONS

Hoff, G.W. "Strong Medicine. Fiber-reinforced polymer materials can help cure many ills that beset concrete" Concrete Construction (2000):40-47.

*Primary Examiner* — David R Deal

(74) *Attorney, Agent, or Firm* — NGUYEN TARBET LLC

(57) ABSTRACT

Systems and methods for reinforcement of tubular structures via composite internal dowels are provided herein. The hardening of a curable fill inside a flexible sleeve provides conformal contact between the resulting dowel and the surrounding tubular structure. Permeation of the fill through the sleeve may improve the bond. Attachment of the sleeve to a narrower tube may allow for precise positioning of the sleeve as well as a reduction in the amount of fill required. Ultimately, the internal dowels may extend past a degraded section of the tubular structure from a selected lower limit below the degraded section to a selected upper limit above the degraded section.

9 Claims, 5 Drawing Sheets

(56) References Cited

U.S. PATENT DOCUMENTS

| | | | |
|---|---|---|---|
| 4,456,401 A * | 6/1984 | Williams | B29C 63/36 |
| | | | 405/150.2 |
| 4,694,622 A | 9/1987 | Richard | |
| 4,728,223 A * | 3/1988 | Rice | E03F 3/06 |
| | | | 405/184.2 |
| 4,865,673 A * | 9/1989 | Shishkin | B29C 63/36 |
| | | | 156/391 |
| 4,931,345 A | 6/1990 | Bottger et al. | |
| 4,993,876 A | 2/1991 | Snow et al. | |
| 5,118,569 A | 6/1992 | Kuroda et al. | |
| 5,198,280 A | 3/1993 | Harpell et al. | |
| 5,398,461 A | 3/1995 | Rose | |
| 5,458,683 A | 10/1995 | Taylor et al. | |
| 5,505,030 A | 4/1996 | Michalcewiz et al. | |
| 5,513,477 A | 5/1996 | Farber | |
| 5,535,786 A * | 7/1996 | Makela | D04B 1/14 |
| | | | 264/269 |
| 5,549,856 A * | 8/1996 | Yokoshima | F16L 55/1651 |
| | | | 264/269 |
| 5,590,689 A * | 1/1997 | Toyoda | B05C 7/08 |
| | | | 264/269 |
| 5,640,825 A | 6/1997 | Ehsani et al. | |
| 5,694,734 A | 12/1997 | Cercone et al. | |
| 5,753,340 A | 5/1998 | Welch et al. | |
| 5,996,521 A | 12/1999 | Kitano et al. | |
| 6,224,294 B1 | 5/2001 | Mansfield | |
| 6,382,878 B1 | 5/2002 | Yang | |
| 6,519,909 B1 | 2/2003 | Fawley | |
| 6,843,194 B1 | 1/2005 | Baudet | |
| 7,780,375 B1 | 8/2010 | Khachaturian et al. | |
| 8,341,860 B2 | 1/2013 | Boyce et al. | |
| 8,353,643 B2 | 1/2013 | Khachaturian et al. | |
| 8,465,228 B2 | 6/2013 | Doleshal | |
| 8,628,275 B1 | 1/2014 | Trader et al. | |
| 8,650,831 B2 | 2/2014 | Ehsani | |
| 8,696,849 B2 | 4/2014 | Butler | |
| 9,038,353 B2 | 5/2015 | Huncovsky | |
| 9,307,796 B2 | 4/2016 | Butler | |
| 9,890,546 B2 | 2/2018 | Ehsani | |
| 10,119,238 B2 | 11/2018 | Doudican et al. | |
| 10,619,321 B2 | 4/2020 | Hess et al. | |
| 10,689,868 B2 | 6/2020 | Saadatmanesh et al. | |
| 11,118,364 B2 | 9/2021 | Saadatmanesh et al. | |
| 2004/0048022 A1 | 3/2004 | Pratt | |
| 2004/0074199 A1 | 4/2004 | Gordin et al. | |
| 2004/0211148 A1 | 10/2004 | Foust et al. | |
| 2005/0023002 A1 * | 2/2005 | Zamora | D04C 1/06 |
| | | | 166/380 |
| 2005/0028881 A1 * | 2/2005 | Smith | F16L 55/1656 |
| | | | 264/269 |
| 2008/0017263 A1 | 1/2008 | Robinson et al. | |
| 2009/0165404 A1 | 7/2009 | Choi | |
| 2015/0159387 A1 | 6/2015 | Chou et al. | |
| 2015/0190972 A1 | 7/2015 | Ehsani | |
| 2016/0060892 A1 | 3/2016 | Odegard et al. | |
| 2016/0076249 A1 | 3/2016 | Gibson et al. | |
| 2016/0145882 A1 | 5/2016 | Ehsani | |

FOREIGN PATENT DOCUMENTS

| | | |
|---|---|---|
| WO | 2006032033 A2 | 3/2006 |
| WO | 2016007503 A1 | 1/2016 |

* cited by examiner

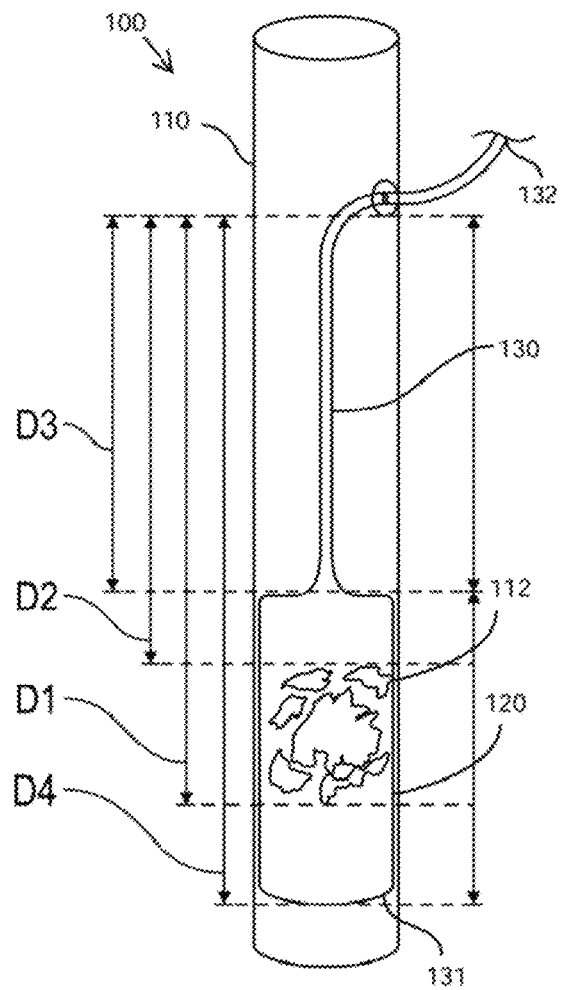 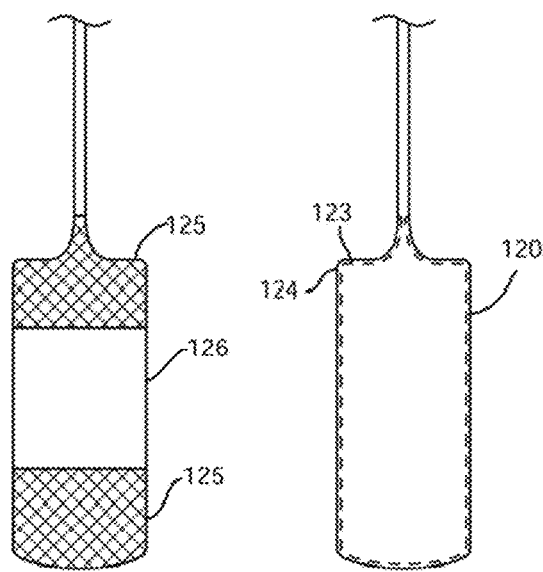
FIG. 1A  FIG. 1B  FIG. 1C

COMPOSITE REINFORCEMENT OF TUBULAR STRUCTURES

CROSS-REFERENCES TO RELATED APPLICATIONS

This application is a non-provisional and claims benefit of U.S. Provisional Application No. 63/328,459 filed Apr. 7, 2022, the specification of which is incorporated herein in its entirety by reference.

FIELD OF THE INVENTION

The present invention relates to the reinforcement of tubular structures via composite systems. More particularly, the present invention relates to systems and methods for reinforcing tubular structures by curing filler materials within flexible sleeves.

BACKGROUND OF THE INVENTION

Many support structures are tubular, or hollow, in shape. This allows for the support structure to have a large cross-sectional area while conserving material and limiting weight. The large cross-sectional area typically increases the strength of the support structure and prevents the structure from bending or breaking. Additionally, in some situations, the void inside the support structure may advantageously allow for wires to be run within the support structure.

A well-known issue with tubular support structures is that the relatively high surface area of the material renders the structures vulnerable to degradation and deterioration. For example, rust may cause deterioration on the surface of a metal support which decreases its structural integrity. In marine applications, degradation may be expedited around the waterline due to the presence of both oxygen and water. As such, a long support structure may have a portion that is significantly weakened, while the remainder of the length may be in much better condition.

BRIEF SUMMARY OF THE INVENTION

It is an objective of the present invention to provide systems, devices, and methods that allow for the reinforcement of tubular structure via composite systems, as specified in the independent claims. Embodiments of the invention are given in the dependent claims. Embodiments of the present invention can be freely combined with each other if they are not mutually exclusive.

In some embodiments, the present invention allows for a curable fill to be precisely positioned in a flexible sleeve within a tubular structure such that when the fill cures, the resulting composite dowel or support provides structural support while minimizing the amount of fill that must be used.

One of the unique and inventive technical features of the present invention is that it includes a flexible sleeve that may be positioned at a specified depth and for a specified length within the support structure. Without wishing to limit the invention to any theory or mechanism, it is believed that the technical feature of the present invention advantageously provides for reinforcement to be strategically applied where it is most needed, without wasting material reinforcing portions of the support structure which do not require reinforcement. None of the presently known prior references or work has the unique inventive technical feature of the present invention.

Furthermore, the inventive technical feature of the present invention is counterintuitive. The reason that it is counterintuitive is because the inventive technical feature contributed to a surprising result. One of ordinary skill in the art would expect that implementing reinforcement from within the structural element would be inefficient in terms of time, labor, and resources when compared to external reinforcement methods. The present invention implements a method for lowering a sleeve into a structural element through an access hole to be filled up and sealed at a degraded section of the structural element. Surprisingly, this method is more efficient in terms of time and resources due to the measurements done to identify the optimal tube and sleeve length before inserting said sleeve into the structural element. Thus, the feature of the present invention contributed to a surprising result.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWINGS

The features and advantages of the present invention will become apparent from a consideration of the following detailed description presented in connection with the accompanying drawings in which:

FIG. 1A shows a schematic illustration of the suspension of a sleeve within a tubular structure with a degraded section ranging between distances D1 and D2 from an access opening. A tube holds the top of the sleeve at a distance D3 from the access opening such that the sleeve extends down past the degraded section at a distance D4 from the access opening FIG. 1B shows a schematic illustration of a sleeve having a central non-permeable segment sandwiched between two permeable segments.

FIG. 1C shows a schematic illustration of a sleeve having both an outer layer and an inner layer.

DETAILED DESCRIPTION OF THE INVENTION

Following is a list of elements corresponding to a particular element referred to herein:

| | |
|---|---|
| 100 | Reinforcement system |
| 110 | Tubular structure |
| 111 | Lower limit of degraded section |
| 112 | Degraded section |
| 113 | Upper limit of degraded section |
| 114 | Reinforced section |
| 115 | Lower limit of reinforced section |
| 116 | Lower portion of reinforced section |
| 117 | Upper limit of reinforced section |
| 118 | Upper portion of reinforced section |
| 120 | Sleeve |
| 121 | First end of sleeve |
| 122 | Second end of sleeve |
| 123 | Inner layer |
| 124 | Outer layer |
| 125 | Permeable segment |

-continued

| | |
|---|---|
| 126 | Non-permeable segment |
| 130 | Tube |
| 131 | First end of tube |
| 132 | Second end of tube |
| 134 | Mark |
| 140 | Fill |
| 150 | Exterior seal |
| 160 | Shear key |

Figure 2A:
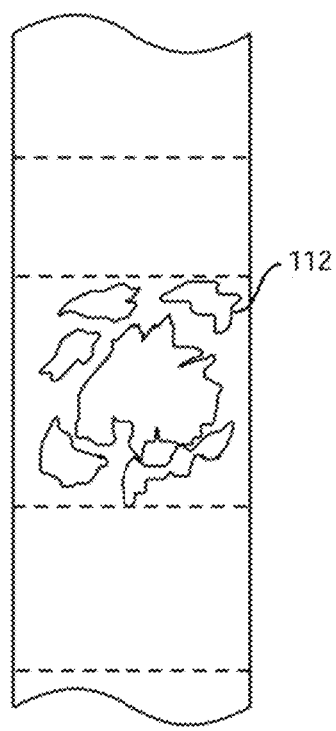
FIG. 2A shows a schematic illustration of a tubular structure having a degraded section.
Figure 2B:
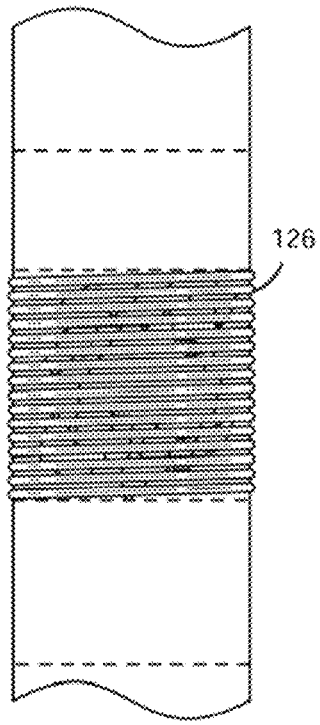
FIG. 2B shows a schematic illustration of the tubular structure in 2A, with a non-permeable seal wrapped around the degraded section.
Figure 2C:
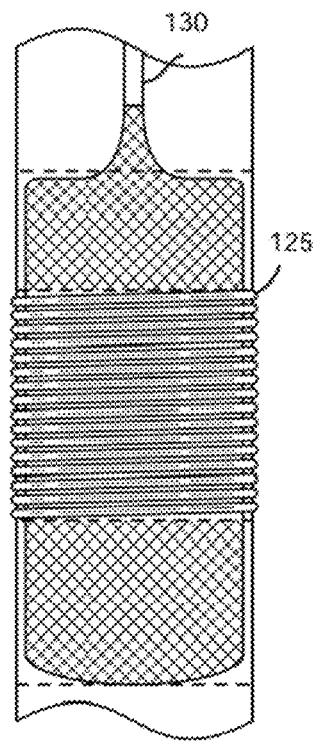
FIG. 2C shows a schematic illustration of the tubular structure in 2B, with a permeable sleeve suspended via a tube to align with the degraded section.
Figure 2D:
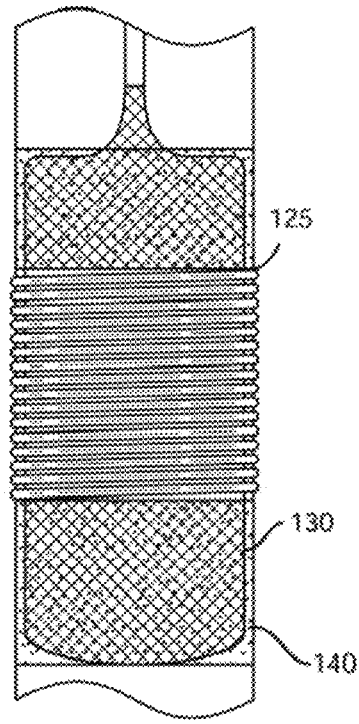
FIG. 2D shows a schematic illustration of the tubular structure in 2C, with a curable fill introduced into the sleeve and permeating through the sleeve to contact the interior of the tubular structure.
Figure 2E:
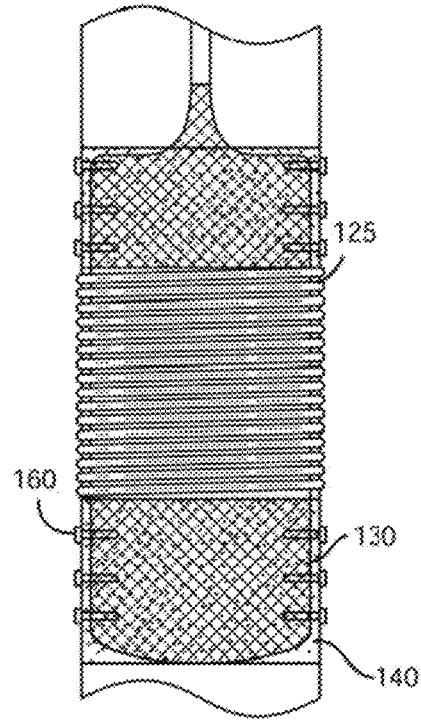
FIG. 2E shows a schematic illustration of the tubular structure in 2D, with shear keys drilled through the tubular structure into the sleeve and curable fill.
Figure 3A:
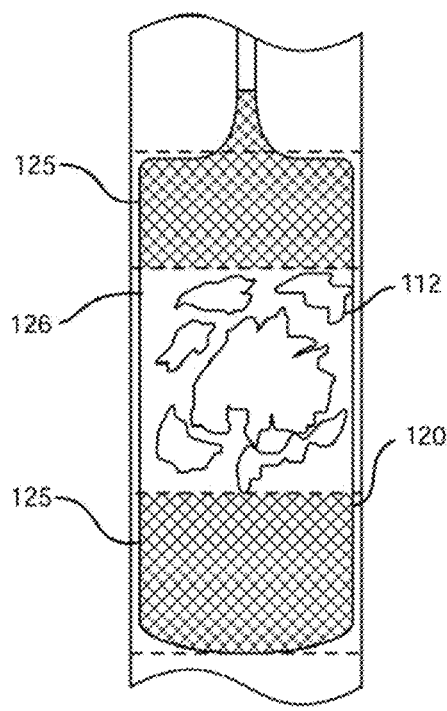
FIG. 3A shows a schematic illustration of a tubular structure having a degraded section. A sleeve is suspended within the tubular structure such that a central non-permeable section is aligned with the degraded section and two permeable sections are positioned on either side of the degraded section.
Figure 3B:
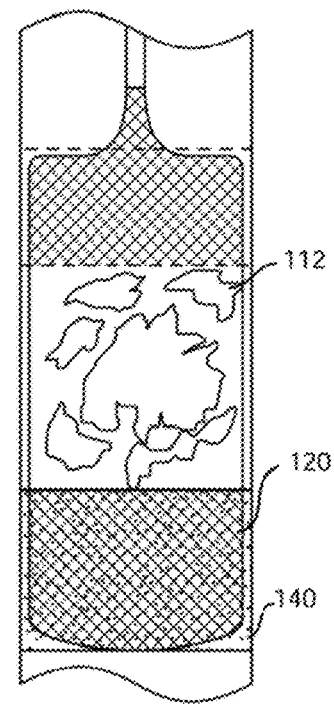
FIG. 3B shows a schematic illustration of the tubular structure in 3A, with the lower permeable section of the sleeve filled with a curable fill.
Figure 3C:
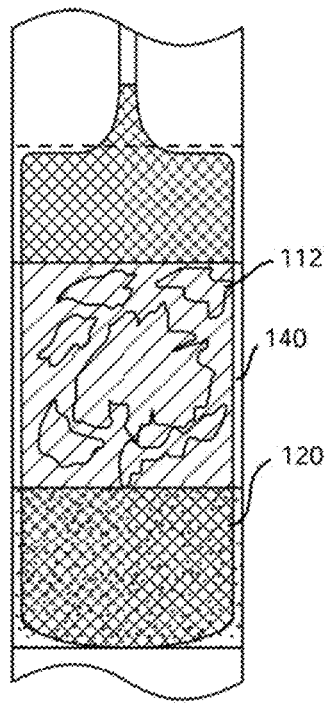
FIG. 3C shows a schematic illustration of the tubular structure in 3B, with the central non-permeable section of the sleeve filled with a curable fill. This may be done before or after the fill in the lower permeable section of the sleeve has cured.
Figure 3D:
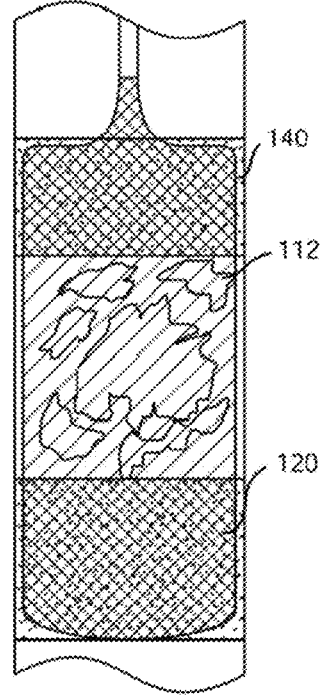
FIG. 3D shows a schematic illustration of the tubular structure in 3C, with the upper permeable section of the sleeve filled with a curable fill. This may be done before or after the fill in the central non-permeable section of the sleeve has cured.
Figure 3E:
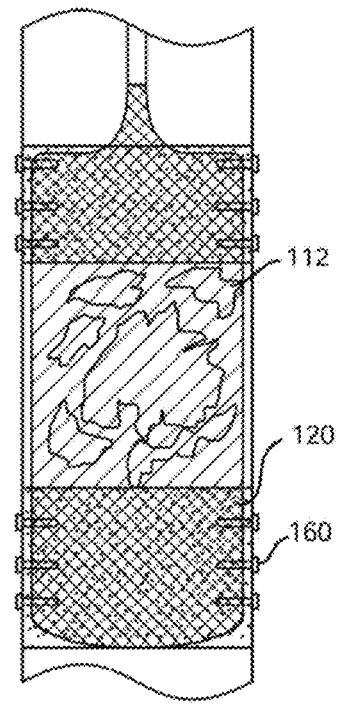
FIG. 3E shows a schematic illustration of the tubular structure in 3D, with shear keys drilled through the tubular structure into the sleeve and curable fill.
Figure 4A:
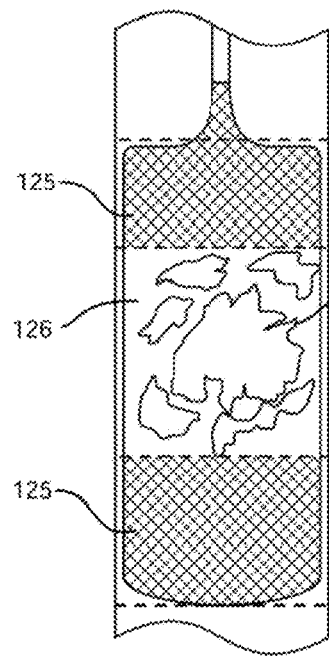
FIG. 4A shows a schematic illustration of a tubular structure having a degraded section. A sleeve is suspended within the tubular structure such that a central non-permeable section is aligned with the degraded section and two permeable sections are positioned on either side of the degraded section.
Figure 4B:
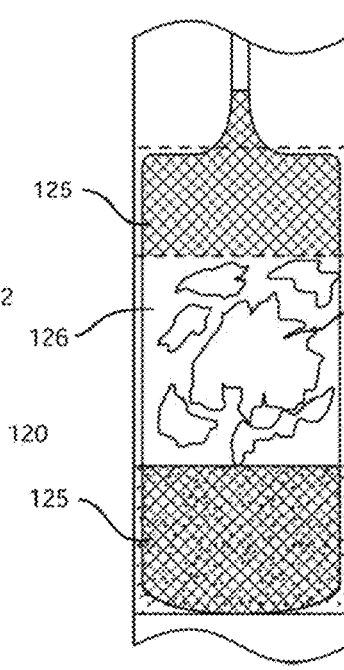
FIG. 4B shows a schematic illustration of the tubular structure in 4A, with the lower permeable section of the sleeve filled with a curable fill.
Figure 4C:
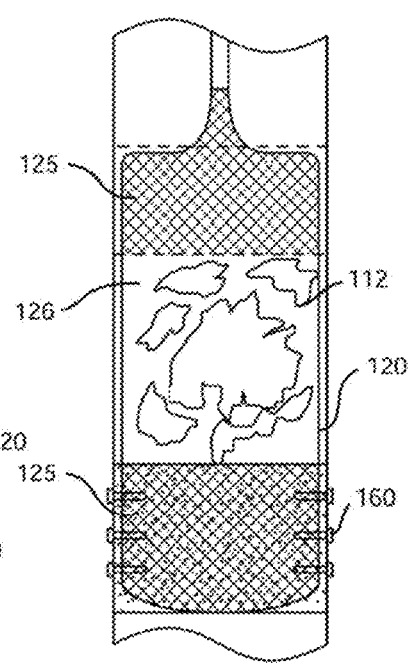
FIG. 4C shows a schematic illustration of the tubular structure in 4B, with shear keys drilled through the tubular structure and into the lower section of the sleeve and curable fill before the fill is fully cured.
Figure 4D:
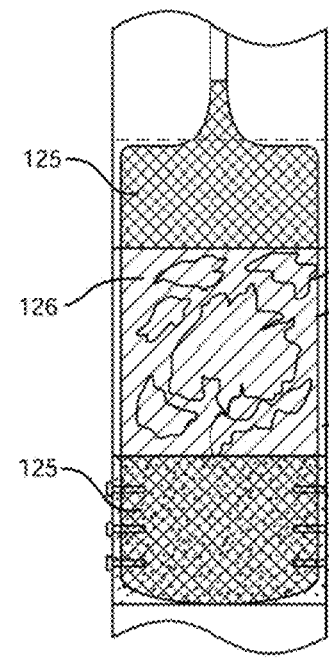
FIG. 4D shows a schematic illustration of the tubular structure in 4C, with the central non-permeable section of the sleeve filled with a curable fill. This may be done before or after the fill in the lower permeable section of the sleeve has cured.
Figure 4E:
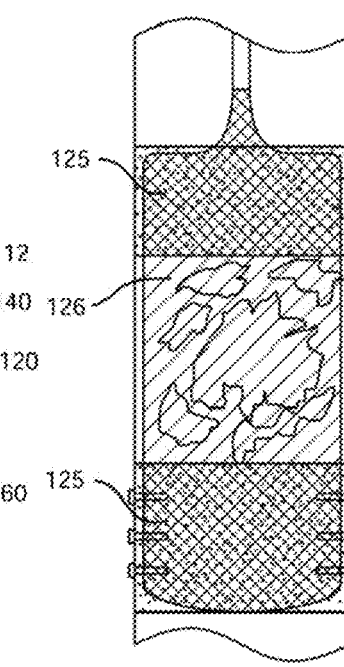
FIG. 4E shows a schematic illustration of the tubular structure in 4D, with the upper permeable section of the sleeve filled with a curable fill. This may be done before or after the fill in the central non-permeable section of the sleeve has cured.
Figure 4F:
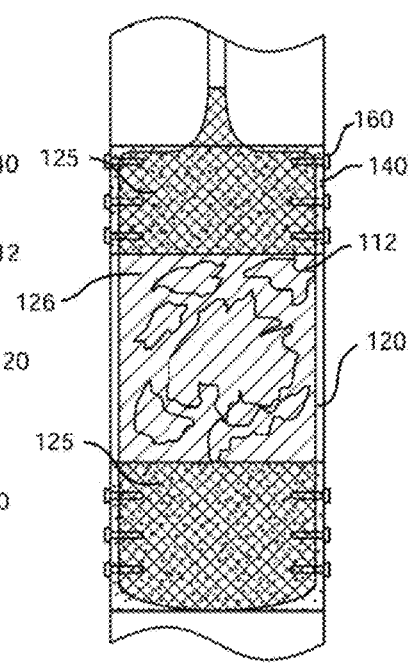
FIG. 4F shows a schematic illustration of the tubular structure in 4E, with shear keys drilled through the tubular structure and into the upper section of the sleeve and curable fill before the fill is fully cured.
Figure 5:
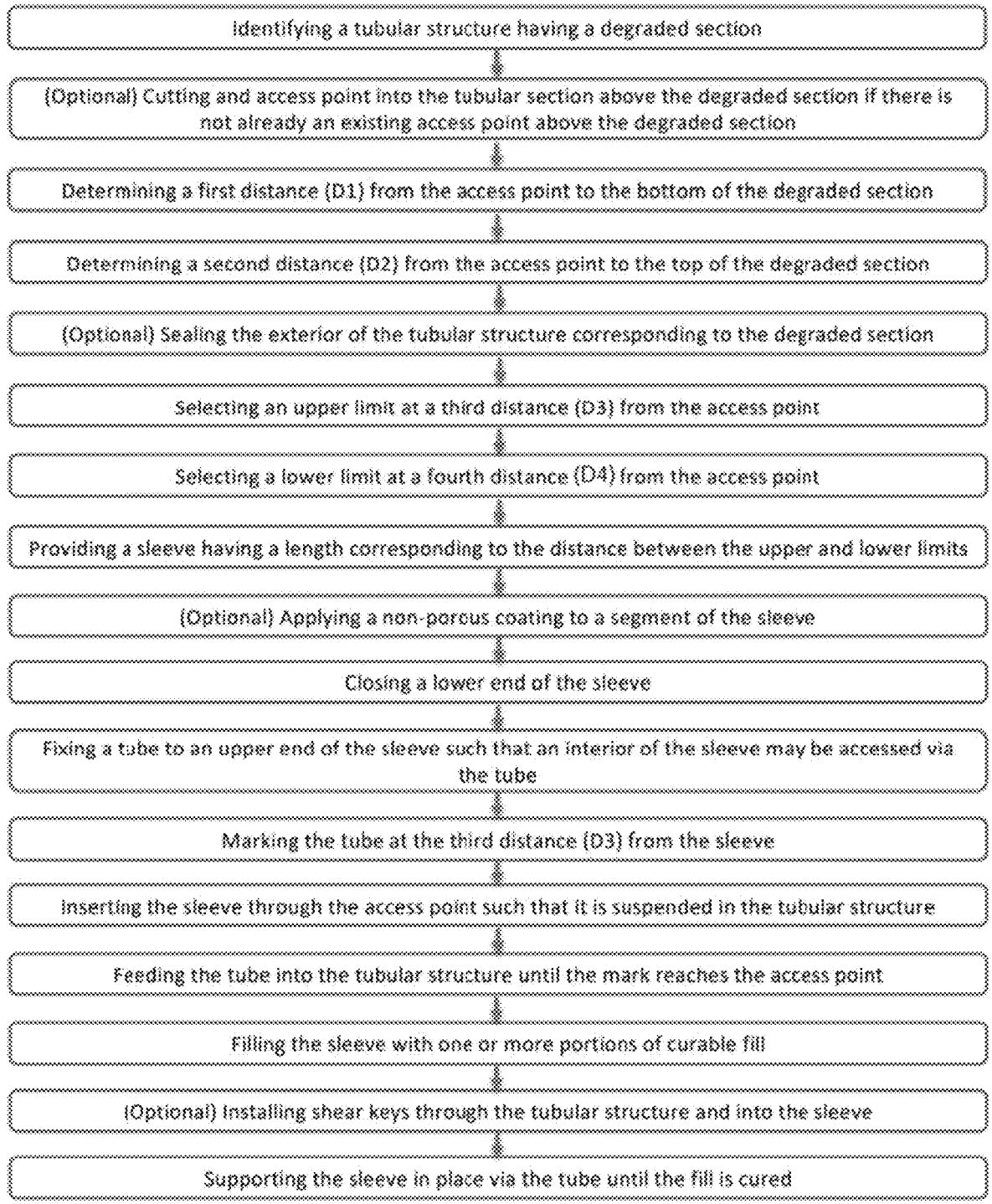
FIG. 5 shows a flow chart of steps for a method of reinforcing a tubular structure having a degraded section.

Referring now to FIGS. 1A-5, the present invention features systems and methods for reinforcing tubular structures. As a non-limiting example, a system for reinforcement of a tubular structure having a degraded section may include a flexible sleeve, a flexible tube, and a curable fill. The length of the flexible sleeve between a first end and a second end may be selected based on the specifications and requirements of the application, such as the diameter or cross-sectional area of the interior of the tubular structure, the length of the degraded section, the severity of the degradation, and the strength requirements of the tubular structure. The flexible sleeve may include only a single layer, an inner layer, and an outer layer, or more than two layers. As a non-limiting example, the sleeve may include a carbon fiber inner layer inside of a fiberglass outer layer.

The flexible tube may have a length between a first end and a second end which is selected considering the distance between an access point in the tubular structure and the degraded section of the tubular structure. In some embodiments, the first end of the tube may be coupled with the second end of the flexible sleeve such that an interior of the flexible sleeve may be accessed through the flexible tube. As such, the tube may provide for both suspensions of the sleeve and also access to its interior.

The curable fill may be configured to enter the flexible sleeve via the flexible tube and cure within the flexible sleeve. This curing may act to form a rigid dowel or structural support within the interior of the tubular structure. In some embodiments, the flexible tube may be configured to support the flexible sleeve at a position within the tubular structure corresponding with the degraded section until at least a portion of the fill cures and fixes the sleeve in place within the tubular structure.

In some embodiments, the sleeve may be at least partially permeable. In some embodiments, the sleeve may include one or more non-permeable segments and one or more permeable segments. As a non-limiting example, the sleeve may include a central non-permeable segment sandwiched between two permeable segments. Without wishing to limit the present invention to any particular theory or mechanism, the non-permeable segment may prevent the curable fill from exiting the tubular structure through voids in the degraded section while the permeable segments may allow the curable fill to permeate through the sleeve to adhere the sleeve to the inner surface of the tubular structure. In some embodiments, the non-permeable segment has a length equal to or greater than the length of the degraded section. In some preferred embodiments, the first end of the flexible sleeve may be closed.

The present invention may feature methods of reinforcing a tubular structure having a degraded section. As a non-limiting example, the method may include: identifying a tubular structure having a degraded section below an access point; providing a flexible sleeve fixed to a flexible tube such that an interior of the flexible sleeve may be accessed through the flexible tube; inserting the sleeve through the access point such that it is suspended in the tubular structure and feeding the tube into the tubular structure until the sleeve is aligned with the degraded section; filling the sleeve with one or more portions of a curable fill; and supporting the sleeve via the tube until one or more portions of the fill are cured. In some embodiments, the length of the sleeve may be greater than the length of the degraded section. In some embodiments, the tubular structure may have a pre-existing access point. In some embodiments, an access point may be cut in the tubular structure above the degraded section.

As another non-limiting method of reinforcing a tubular structure having a degraded section, the method may include: identifying a tubular structure having a degraded section below an access point; determining a first distance (D1) from the access point to a bottom of the degraded section; determining a second distance (D2) from the access point to a top of the degraded section; selecting an upper limit at a third distance (D3) from the access point; selecting a lower limit at a fourth distance (D4) from the access point; providing a sleeve having a length corresponding to the distance between the upper and lower limits; fixing a tube to an upper end of the sleeve such that an interior of the sleeve may be accessed via the tube; marking the tube at the third distance (D3) from the sleeve; inserting the sleeve through the access point such that it is suspended in the tubular structure; feeding the tube into the tubular structure until the mark reaches the access point; filling the sleeve with one or more portions of a curable fill; and supporting the sleeve via the tube until one or more portions of the fill are cured. In some embodiments, the sleeve is held within the structural element for filling by either a layer of secondary filler material (i.e. sand, gravel, concrete) disposed below the sleeve, or the sleeve is supported by the tube and a first portion of the curable fill is used to seal the sleeve to the structural element. After this first portion has cured, the sleeve is supported and can be filled completely with the curable fill. In some embodiments, the sleeve is mechanically attached to the tube, adhered to the tube by a glue or resin, or may be fabricated with the tube in place.

The method may additionally include sealing a segment of an exterior of the tubular structure corresponding to the degraded section. As a non-limiting example, the segment may be sealed by wrapping an adhesive tape around the segment. As another non-limiting example, the segment may be sealed by fixing one or more plates or shells over the degraded section. In some embodiments, a non-permeable seal may be applied to a segment of the sleeve. As a non-limiting example, the segment of the sleeve to which the non-permeable seal is applied may correspond to the degraded section. A lower end of the sleeve may be closed. As a non-limiting example, the method may include fastening a lower end of the sleeve. In some embodiments, shear keys may be installed through the tubular structure and into the sleeve, either before or after the fill has cured to further aid in supporting the sleeve within the structural element. In some embodiments, after filling the sleeve, the tube is left in place or cut off at the access point and the access point may be sealed.

As yet another non-limiting example, a method of reinforcing a tubular structure having a degraded section may include: identifying a tubular structure having a degraded section below an access point; inserting a flexible sleeve through the access point such that it is partially suspended in the tubular structure and feeding the sleeve into the tubular structure until a portion of the sleeve is aligned with the degraded section; filling the sleeve with a first portion of a curable fill; supporting the sleeve until the first portion of the fill is cured; and filling the sleeve with a second portion of the fill. As a non-limiting example, the first portion of fill may have a volume such that it fills the bottom foot, two feet, three, feet, four feet, five feet, or more of the sleeve. In some embodiments, the cured first portion of fill supports the sleeve and the second portion of fill until the second portion of fill is cured. The method may additionally include filling the sleeve with a third portion of fill after the second portion of fill is cured. Without wishing to limit the present invention to any particular theory or mechanism, it is believed that filling the sleeve with multiple portions of fill allow for the sleeve to be held in place by the cured portion or portions while the other portions cure and also allows for separate curing within permeable and non-permeable segments of the sleeve such that permeation of the fill through the sleeve is separately controlled in different segments of the sleeve. As a non-limiting example, the first portion of fill may fill the sleeve up to a bottom of the degraded section and the second portion of fill may fill the sleeve up to a top of the degraded section. The separate portions of fill may have identical or non-identical formulation. As a non-limiting example, a first portion of fill may have a higher or lower viscosity than subsequent portions of fill.

As still another non-limiting example, a method of reinforcing a tubular structure having a degraded section may include: identifying a tubular structure having a degraded section below an access point; inserting a flexible sleeve through the access point such that it is partially suspended in the tubular structure and feeding the sleeve into the tubular structure until a portion of the sleeve is aligned with the degraded section; filling the sleeve to a point between the degraded section and the access point with one or more portions of a curable fill; and supporting the sleeve via the tube until one or more portions of the fill are cured. In some embodiments, the point to which the sleeve is filled may be a predetermined distance above the degraded section. As non-limiting examples, the point to which the sleeve is filled may be about 1, 2, 3, 4, 5, or more feet above the degraded section.

In some embodiments, a portion of the sleeve extending to the exterior of the tubular structure may be spread and fixed around the access point to provide support of the sleeve. In some embodiments, the access point may be through a top slab at the top end of the tubular structure, or through the side of the tubular structure. The tubular structure may have a round or a rectangular cross-section. In some embodiments, a bottom of the sleeve may extend through a second access point below the degraded section.

In some embodiments, the curable fill may comprise any type of concrete, polymer concrete, pure epoxy, or a combination thereof. In some embodiments, the flexible sleeve may comprise fiberglass, carbon, Kevlar®, or a combination thereof. In some embodiments, the flexible tube may comprise plastic polyethylene, flexible polyvinyl chloride (PVC), nylon tubing, polymer tubing, polyurethane tubing, high-density polyethylene (HDPE) tubing, fluorinated ethylene propylene (FEP) tubing, polypropylene tubing, perfluoroalkoxy (PFA) tubing, or a combination thereof.

EXAMPLE

The following is a non-limiting example of the present invention. It is to be understood that said example is not intended to limit the present invention in any way. Equivalents or substitutes are within the scope of the present invention.

Example 1: Reinforcement of a Partially Submerged Pile

A pile of a pier is determined to have a degraded section at the waterline, extending from 9 feet from the top of the pile to 11 feet from the top of the pile. It is determined that for this application, the pile should be reinforced from one foot below the degraded section to one foot above the degraded section. An access hole is cut through the top of the pier such that the interior of the hollow pile may be accessed through the top end of the pile.

A sleeve is prepared that is four feet in length, with a bottom end fastened shut and a top end fixed to a long flexible tube. The sleeve is permeable except for a two-foot segment in the center. Thus, the bottom one foot segment and the top one foot segment of the sleeve are permeable.

The tube is marked at a distance 8 feet from the sleeve, and the sleeve is inserted into the interior of the pile through the access hole such that it is suspended by the tube. The tube is fed through the access hole to lower the sleeve until the mark on the tube reaches the top of the pile.

A volume of the lower permeable segment of the sleeve is calculated and a first portion of curable fill corresponding to this volume is fed through the tube into the interior of the sleeve. The sleeve is supported in place by the tube while this first portion of fill is cured. This first portion of fill supports the segment of the sleeve below the degraded section, and permeates through the sleeve to bond the sleeve to the interior surface of the pile.

A volume of the center non-permeable segment of the sleeve is calculated and a second portion of curable fill corresponding to this volume is fed through the tube into the interior of the sleeve. This second portion of fill cures within the non-permeable segment of the sleeve corresponding to the degraded section of the pile without permeating through the sleeve.

Finally, a volume of the upper permeable segment of the sleeve is calculated and a third portion of curable fill corresponding to this volume is fed through the tube into the interior of the sleeve. This third portion of fill cures within the upper permeable segment of the sleeve and permeates through the sleeve to bond the sleeve to the interior surface of the pile.

In some embodiments, the sleeve may be saturated before inserting into the tubular structure with any polymer resin used in composite application, such as epoxy, vinyl ester, polyester, or a combination thereof. In some embodiments, the sleeve may be saturated with the resin in the polymer concrete filler.

In some embodiments, a hollow section below the newly reinforced portion of the structural element may be filled with a filler material such as sand, gravel, concrete, or a combination thereof.

In some embodiments, the access hole may be disposed anywhere on the structural element, such as on the side of the structural element or through the top of the structural element.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of reinforcing a tubular structure (110) having a degraded section (112), the method comprising:
    a) identifying a tubular structure (110) having a degraded section (112) below an access point;
    b) inserting a flexible sleeve (120) through the access point such that it is partially suspended in the tubular structure (110) and feeding the sleeve (120) into the tubular structure (110) until a portion of the sleeve (120) is aligned with the degraded section (112);
    c) filling the sleeve (120) with a first portion of a curable fill (140);
    d) supporting the sleeve (120) until the first portion of the fill (140) is cured; and
    e) filling the sleeve (120) with a second portion of the fill (140);
        wherein the first portion of fill (140) supports the second portion of fill (140) until the second portion of fill (140) is cured.

2. A method of reinforcing a tubular structure (110) having a degraded section (112), the method comprising:
    a) identifying a tubular structure (110) having a degraded section (112) below an access point;
    b) inserting a flexible sleeve (120) through the access point such that it is partially suspended in the tubular structure (110) and feeding the sleeve (120) into the tubular structure (110) until a portion of the sleeve (120) is aligned with the degraded section (112);
    c) filling the sleeve (120) with a first portion of a curable fill (140);
    d) supporting the sleeve (120) until the first portion of the fill (140) is cured;
    e) filling the sleeve (120) with a second portion of the fill (140); and
    f) filling the sleeve (120) with a third portion of fill after the second portion of fill is cured.

3. A method of reinforcing a tubular structure (110) having a degraded section (112), the method comprising:
    a) identifying a tubular structure (110) having a degraded section (112) below an access point;
    b) determining a first distance (D1) from the access point to a bottom of the degraded section (112);
    c) determining a second distance (D2) from the access point to a top of the degraded section (112);
    d) sealing a segment of an exterior of the tubular structure (110) corresponding to the degraded section (112) by wrapping an adhesive tape around the segment or by fixing one or more plates or shells over the degraded section (112);
    e) selecting an upper limit at a third distance (D3) from the access point, wherein D3 is less than D2;
    f) selecting a lower limit at a fourth distance (D4) from the access point, wherein D4 is greater than D1;

g) providing a sleeve (120) having a length corresponding to the distance between the upper and lower limits;
h) applying a non-permeable coating to a segment of the sleeve (120), wherein the segment of the sleeve (120) to which the non-permeable coating is applied corresponds to the degraded section (112);
i) saturating the sleeve (120) with a polymer resin;
j) fastening a lower end of the sleeve (121);
k) fixing a tube (130) to an upper end of the sleeve (122) such that an interior of the sleeve (120) may be accessed via the tube (130);
l) applying a mark to the tube (130) at the third distance (D3) from the sleeve (120);
m) filling a hollow section below the sleeve (120) with a secondary filler material;
n) inserting the sleeve (120) through the access point such that it is suspended in the tubular structure (110);
o) feeding the tube (130) into the tubular structure (110) until the mark reaches the access point;
p) filling the sleeve (120) with one or more portions of a curable fill (140);
q) installing shear keys (160) through the tubular structure (110) and into the sleeve (120); and
r) supporting the sleeve (120) via the tube (130) until one or more portions of the fill (140) are cured.

4. The method of claim 3, wherein a first portion of fill (140) has a volume such that it fills the lower end of the sleeve (121).

5. The method of claim 4, wherein the first portion of fill (140) supports a second portion of fill (140) until the second portion of fill (140) is cured.

6. The method of claim 5, additionally comprising filling the sleeve (120) with a third portion of fill after the second portion of fill is cured.

7. The method of claim 3, wherein a first portion of fill (140) fills the sleeve (120) up to a bottom of the degraded section (112).

8. The method of claim 7, wherein a second portion of fill (140) fills the sleeve (120) up to a top of the degraded section (112).

9. The method of claim 3, wherein the secondary filler material comprises sand, gravel, concrete, or a combination thereof.

* * * * *